United States Patent
Cook et al.

(10) Patent No.: US 8,424,256 B2
(45) Date of Patent: Apr. 23, 2013

(54) ASPHALT ROOF INTEGRATED PHOTOVOLTAIC

(76) Inventors: Thomas Lawson Cook, Littleton, CO (US); John Dean Scollon, Rio Rancho, NM (US)

(*) Notice: Subject to any disclaimer, the term of this patent is extended or adjusted under 35 U.S.C. 154(b) by 324 days.

(21) Appl. No.: 12/798,236

(22) Filed: Apr. 1, 2010

(65) Prior Publication Data
US 2011/0239555 A1    Oct. 6, 2011

(51) Int. Cl.
*E04D 13/18* (2006.01)
(52) U.S. Cl.
USPC ............................ 52/173.3; 126/622; 136/251
(58) Field of Classification Search ................. 52/173.3; 136/244, 251, 206, 230; 126/621, 622, 623
See application file for complete search history.

(56) References Cited

U.S. PATENT DOCUMENTS

| | | | | |
|---|---|---|---|---|
| 3,769,091 A * | 10/1973 | Leinkram et al. | ............. | 136/246 |
| 4,040,867 A * | 8/1977 | Forestieri et al. | ............. | 136/244 |
| 4,180,414 A * | 12/1979 | Diamond et al. | ............. | 136/246 |
| 4,189,881 A * | 2/1980 | Hawley | ............................ | 52/91.3 |
| 4,617,420 A * | 10/1986 | Dilts et al. | ..................... | 136/244 |
| 4,677,248 A * | 6/1987 | Lacey | ............................ | 136/244 |
| 4,936,063 A * | 6/1990 | Humphrey | ..................... | 52/200 |
| 5,056,288 A * | 10/1991 | Funaki | ............................. | 52/545 |
| 5,112,408 A * | 5/1992 | Melchior | ....................... | 136/251 |
| 5,232,518 A * | 8/1993 | Nath et al. | ..................... | 136/251 |
| 5,316,592 A * | 5/1994 | Dinwoodie | ................... | 136/244 |
| 5,409,549 A * | 4/1995 | Mori | ............................. | 136/244 |
| 5,437,735 A * | 8/1995 | Younan et al. | ................. | 136/251 |
| 5,524,401 A * | 6/1996 | Ishikawa et al. | ............. | 52/173.3 |
| 5,575,861 A * | 11/1996 | Younan et al. | ................. | 136/251 |
| 5,613,337 A * | 3/1997 | Plath et al. | ....................... | 52/533 |
| 5,746,839 A * | 5/1998 | Dinwoodie | ................... | 136/251 |
| 5,990,414 A * | 11/1999 | Posnansky | .................... | 136/244 |
| 6,155,006 A * | 12/2000 | Mimura et al. | .............. | 52/173.3 |
| 6,173,546 B1 * | 1/2001 | Schafer | .......................... | 52/522 |
| 6,182,403 B1 * | 2/2001 | Mimura et al. | .............. | 52/173.3 |
| 6,336,304 B1 * | 1/2002 | Mimura et al. | .............. | 52/748.1 |
| 6,463,708 B1 * | 10/2002 | Anderson | ....................... | 52/521 |
| 6,541,693 B2 * | 4/2003 | Takada et al. | ................. | 136/244 |
| 6,584,737 B1 * | 7/2003 | Bradley, Jr. | .................. | 52/173.3 |
| 6,617,507 B2 * | 9/2003 | Mapes et al. | .................. | 136/251 |
| 6,786,012 B2 * | 9/2004 | Bradley, Jr. | .................. | 52/173.3 |
| 6,883,290 B2 * | 4/2005 | Dinwoodie | ................... | 52/748.1 |
| 7,138,578 B2 * | 11/2006 | Komamine | .................... | 136/251 |
| 7,155,870 B2 * | 1/2007 | Almy | ............................. | 52/544 |
| 7,178,295 B2 * | 2/2007 | Dinwoodie | ................... | 52/173.3 |
| 7,307,209 B2 * | 12/2007 | Mapes et al. | .................. | 136/251 |
| 7,328,534 B2 * | 2/2008 | Dinwoodie | ................... | 52/173.3 |
| 7,772,484 B2 * | 8/2010 | Li et al. | ........................... | 136/244 |
| 7,777,128 B2 * | 8/2010 | Montello et al. | ............. | 136/256 |
| 7,781,672 B2 * | 8/2010 | Gaudiana et al. | ............. | 136/256 |
| 7,829,781 B2 * | 11/2010 | Montello et al. | ............. | 136/244 |
| 8,124,866 B2 * | 2/2012 | Mapes et al. | .................. | 136/244 |
| 8,205,400 B2 * | 6/2012 | Allen | ............................ | 52/173.3 |
| 2003/0094193 A1 * | 5/2003 | Mapes et al. | .................. | 136/244 |

(Continued)

*Primary Examiner* — William Gilbert
*Assistant Examiner* — James Ference
(74) *Attorney, Agent, or Firm* — Mind Law Firm, P.C.; Justin G. Sanders; Jeromye V. Sartain

(57) ABSTRACT

A roof integrated photovoltaic roofing panel and flashing system that allows photovoltaic roof panels to be installed into standard asphalt roofing. Without re-engineering rafters for extra roof loads. Providing all structural strengths, fire prevention and weather proofing required by building codes. The panels are easily removed for maintaining PV system. The PV roof panel is a structural roof panel.

15 Claims, 4 Drawing Sheets

U.S. PATENT DOCUMENTS

| | | | | |
|---|---|---|---|---|
| 2003/0154666 A1* | 8/2003 | Dinwoodie | ............... | 52/173.3 |
| 2003/0154667 A1* | 8/2003 | Dinwoodie | ............... | 52/173.3 |
| 2005/0166955 A1* | 8/2005 | Nath et al. | ............... | 136/251 |
| 2006/0032527 A1* | 2/2006 | Stevens et al. | ............... | 136/251 |
| 2006/0266405 A1* | 11/2006 | Lenox | ............... | 136/244 |
| 2007/0193618 A1* | 8/2007 | Bressler et al. | ............... | 136/244 |
| 2008/0087320 A1* | 4/2008 | Mapes et al. | ............... | 136/244 |
| 2008/0098672 A1* | 5/2008 | O'Hagin et al. | ............... | 52/173.3 |
| 2008/0190047 A1* | 8/2008 | Allen | ............... | 52/173.3 |
| 2008/0289272 A1* | 11/2008 | Flaherty et al. | ............... | 52/173.3 |
| 2008/0302030 A1* | 12/2008 | Stancel et al. | ............... | 52/173.3 |
| 2008/0302031 A1* | 12/2008 | Bressler et al. | ............... | 52/173.3 |
| 2008/0302407 A1* | 12/2008 | Kobayashi | ............... | 136/251 |
| 2008/0313976 A1* | 12/2008 | Allen | ............... | 52/173.1 |
| 2009/0000221 A1* | 1/2009 | Jacobs et al. | ............... | 52/173.3 |
| 2009/0000222 A1* | 1/2009 | Kalkanoglu et al. | ............... | 52/173.3 |
| 2009/0178350 A1* | 7/2009 | Kalkanoglu et al. | ............... | 52/173.3 |
| 2009/0205270 A1* | 8/2009 | Shaw et al. | ............... | 52/173.3 |
| 2009/0223550 A1* | 9/2009 | Curtin et al. | ............... | 136/244 |
| 2009/0282755 A1* | 11/2009 | Abbott et al. | ............... | 52/173.3 |
| 2009/0293383 A1* | 12/2009 | Venter et al. | ............... | 52/173.3 |
| 2010/0170169 A1* | 7/2010 | Railkar et al. | ............... | 52/173.3 |
| 2010/0275534 A1* | 11/2010 | Ruskin et al. | ............... | 52/173.3 |
| 2010/0313499 A1* | 12/2010 | Gangemi | ............... | 52/173.3 |
| 2010/0313928 A1* | 12/2010 | Rose et al. | ............... | 136/244 |
| 2011/0056148 A1* | 3/2011 | Jenkins et al. | ............... | 52/90.1 |

* cited by examiner

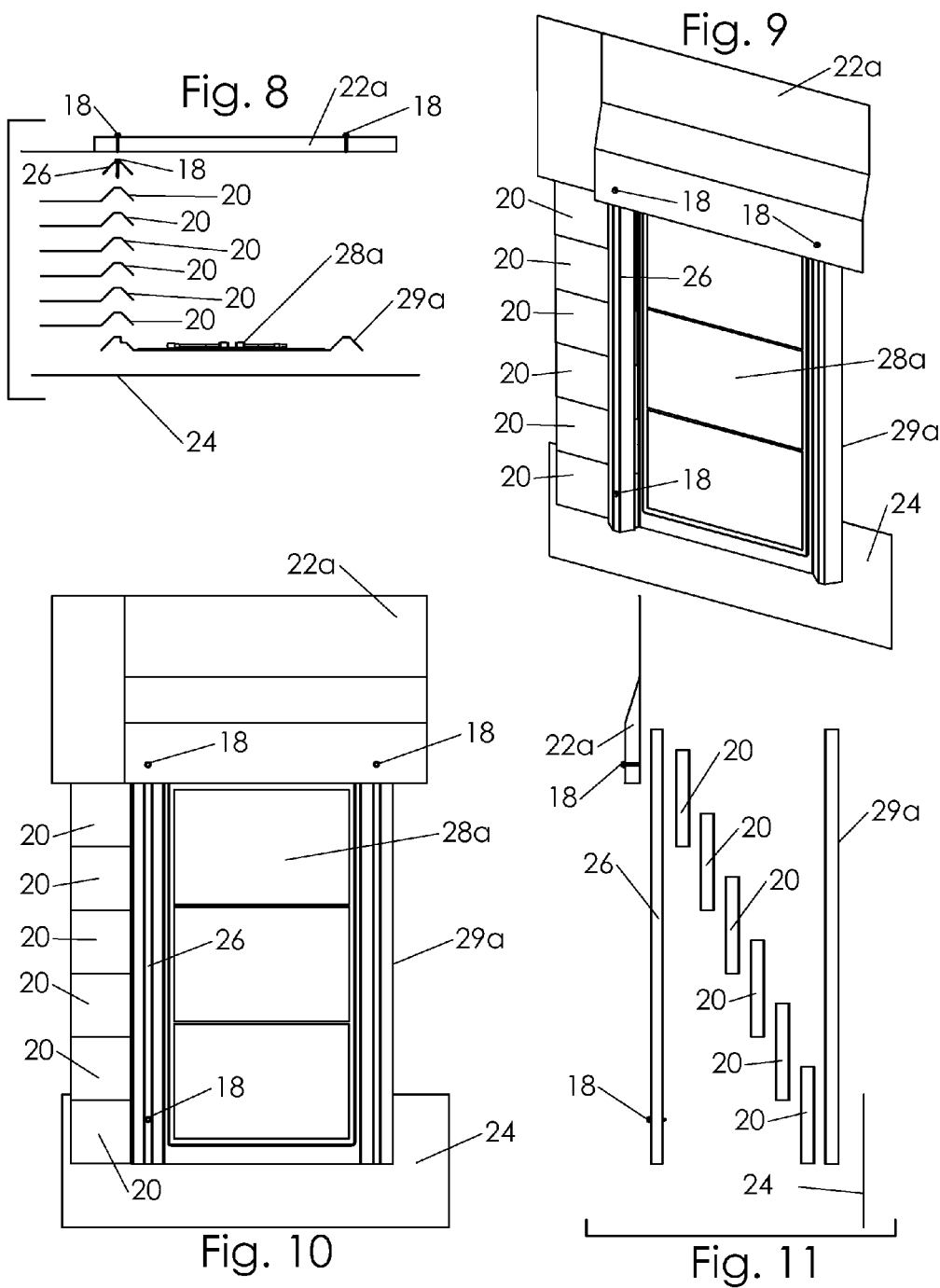

ASPHALT ROOF INTEGRATED PHOTOVOLTAIC

CROSS-REFERENCE TO RELATED APPLICATION

Not Applicable

FEDERALLY SPONSORED RESEARCH

Not Applicable

BACKGROUND OF THE INVENTION

1. Field of Invention

This invention relates to Photovoltaic Roof Panels and Flashing, Specifically to integration into asphalt roof systems.

2. Background of the Invention

Photovoltaic manufactures have made solar cells capable of generating electricity, but have not provided the means of mounting these Photovoltaic cells to structures in a manner that meet building code standards. Building codes that have been developed to be used together set forth for strength design, fire prevention and weather protection.

The Thin Film Amorphous photovoltaic manufactures have designed PV cells to be adhered to metal and rubber membranes used in manufacturing roofing materials. Leaving designers to develop a product made of these materials that meet the building codes. Limiting their use to roofs, that all ready uses these roofing systems and fit the criteria of mounting the PV cells or new products developed to merge the Photovoltaic and roofing material. Adhering PV Laminates directly to existing roof systems makes it hard or impossible to service the photovoltaic system, and the roof system without total replacement of each system. If a photovoltaic cells on one roof panel goes bad and quits producing electricity at an acceptable rate it will degrade the power of several panels connected to that series. This will drastically reduce the output of the whole system. The wiring together of these PV cells is critical in the system design. For optimal performance of the photovoltaic system, you need to be able to replace bad or low efficiency photovoltaic cells, in the same physical location for wiring logistics. You can't just bypass a bad photovoltaic roof panels in wiring, without rewiring the complete system to even out the number of cells in each series.

Peeling off the photovoltaic cells from the panel in a manner to reuse the metal panel isn't really possible. Removing a standard metal roof panel with concealed fasteners is not cost effective and often you need to remove several panels to replace one.

Exposed fastener roof panels are designed with multiple structural ribs and don't have enough room between the ribs for existing thin film amorphous photovoltaic cells. If the manufacture custom made them to fit an existing exposed fastener panel you would still have three separate sets of cells on one panel and would have to replace all three if one goes bad.

Most existing metal roof panels with concealed fasteners and exposed fastener have small stiffening ribs between the large structural ribs that won't allow for proper adhesion for the thin film amorphous cells. So installing the cells to nearly all existing metal roof is not practical.

Current metal roof panels don't allow for installation and removal of PV panels horizontally and vertically on the roof.

Current installations of photovoltaic system over the top off existing roofing, requires an engineer to recertify the rafters that support the roof. The rafter must be able to handle the extra weight of the photovoltaic system.

Current fire codes require a path to the ridge without having the firefighter cross over photovoltaic systems. These new codes require easement along the rakes, valleys and ridge of the roof. It's standard firefighter practice to make a hole in the ridge, to release dangerous gases. The firefighter cannot cut through or walk on a photovoltaic system because of electrocution dangers.

OBJECTS AND ADVANTAGES

Accordingly, besides the objects and advantages of the roof integrated photovoltaic panels and flashing system described in my above patent, several objects and advantages of the present invention are:

(a) to provide a roofing panel that the Thin Film Amorphous Photovoltaic cells will properly adhere to;

(b) to provide a roof panel that is fastened to the roof deck with self sealing exposed fasteners (c) to provide a roof panel that allows for easy individual installation and removal (d) to provide a roofing panel that meets Standard building codes for strength design;

(e) to provide a roofing panel that meets standard building codes for fire prevention;

(f) to provide a roofing panel that meets standard building code for weather protection;

(g) to provide a flashing system that allows the photovoltaic roof panels to be integrated into standard asphalt roofing in a manner that meets standard building codes for strength design;

(h) to provide a flashing system that allows the photovoltaic roof panels to be integrated into standard asphalt roofing in a manner that meets standard building codes for fire prevention;

(i) to provide a flashing system that allows the photovoltaic roof panels to be integrated into standard asphalt roofing in a manner that meets standard building codes for weather protection;

(j) to provide serviceability to maintain the photovoltaic system or asphalt roofing system without interfering with the other system;

(k) to provide a photovoltaic roof panel that is easily removable and replaceable for keeping the existing wiring of the photovoltaic system in its original state;

(l) to provide a roof integrated photovoltaic panels and flashing system that allows a photovoltaic system to be installed on just the part of the roof needed;

(m) to provide a roof integrated photovoltaic panels and flashing system that allow the rest of the roof to be installed in standard asphalt roofing;

(n) to provide a photovoltaic system mounted to a roof without adding extra weight to the roof system;

(o) to provide a photovoltaic system mounted to a roof that wouldn't require re-engineering of the rafters of the building;

(p) to provide a photovoltaic system that allows easement for firefighters with standard asphalt roofing;

(q) to provide a more cost effective installation of a photovoltaic system;

(r) to provide PV roof panels that seam together up and across the roof;

SUMMARY

In accordance with the present invention a asphalt roof integrated photovoltiac comprises a self sealing exposed fastener metal roof panel that allow for ease in individual panel removal and installation, a base for adhering a thin film amorphous photovoltaic cells and with structural ribs on the vertical edges, a step flashing that integrates the photovoltaic metal roof panel into asphalt roofing, a counter flashing to cover the step flashing, a starter flashing for the transition of the metal roof panel over the top of the asphalt roofing, a top flashing for the transition of the asphalt roofing over the top of the photovoltaic metal roof panel.

DRAWINGS

Figures

Figure 5:
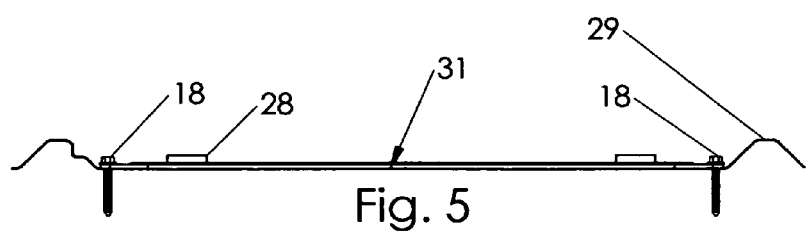

FIG. 5 shows a front view of a thin film amorphous photovoltaic cells adhered to a metal roof panel the combination of these two parts make a PV solar panel. It also shows self sealing exposed fasteners. These fasteners screw the PV solar panel into the roof deck.

Figure 6:
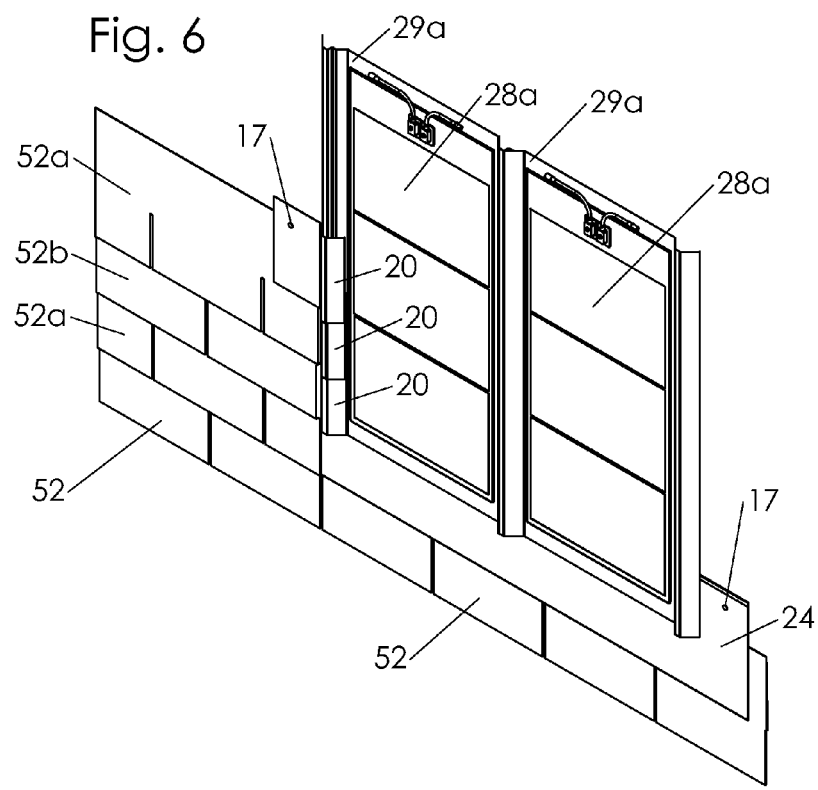

FIG. 6 shows an isometric view of 2 thin film amorphous photovoltaic cells adhered to 2 roof panels, a starter flashing with a roofing nail, step flashing with a roofing nail and asphalt shingles.

Figure 7:
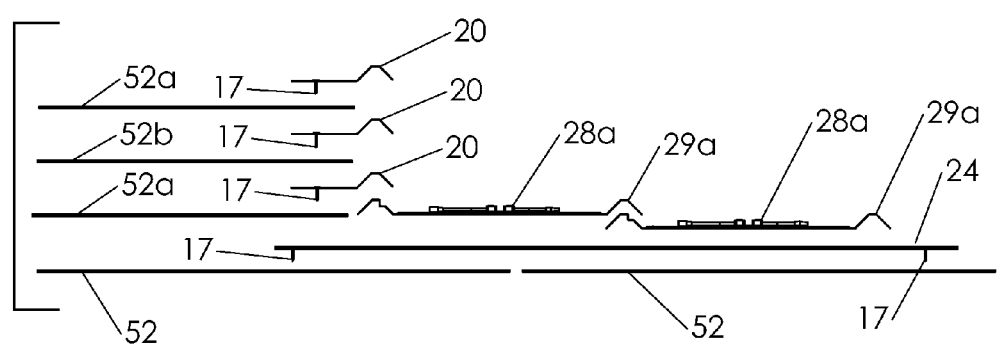

FIG. 7 shows a front exploded view of 2 thin film amorphous photovoltaic cells adhered to 2 metal roof panel, a starter flashing with roofing nail, step flashing with roofing nail and asphalt shingles.

FIG. 8 shows a front exploded view of a thin film amorphous photovoltaic cells adhered to a metal roof panel, step flashing, counter flashing and top flashing with self sealing exposed fasteners.

FIG. 9 shows an isometric view of thin film amorphous photovoltaic cells, a metal roof panel, step flashing, counter flashing and top flashing with self sealing exposed fasteners.

FIG. 10 shows a top view of a thin film amorphous photovoltaic cells, a metal roof panel, step flashing, counter flashing and top flashing with self sealing exposed fasteners.

FIG. 11 shows a side view of a thin film amorphous photovoltaic cells, a metal roof panel, step flashing, counter flashing and top flashing with self sealing exposed fasteners.

| DRAWINGS-Reference Numbers | | | |
|---|---|---|---|
| 28 | PV thin film laminates | 20 | Step Flashing |
| 28a | Short PV thin film laminate | 22 | Top Flashing |
| 29 | solar base roofing panel | 24 | Starter Flashing |
| 29a | Short Solar base roofing panel | 26 | Counter Flashing |
| 31 | PV Roof panel | 44 | PV roof panel and flashing system |
| 52 | Asphalt Shingle | 18 | Self Sealing Exposed Fastener |
| 17 | Roofing nail | | |

DETAILED DESCRIPTION

Figure 1:
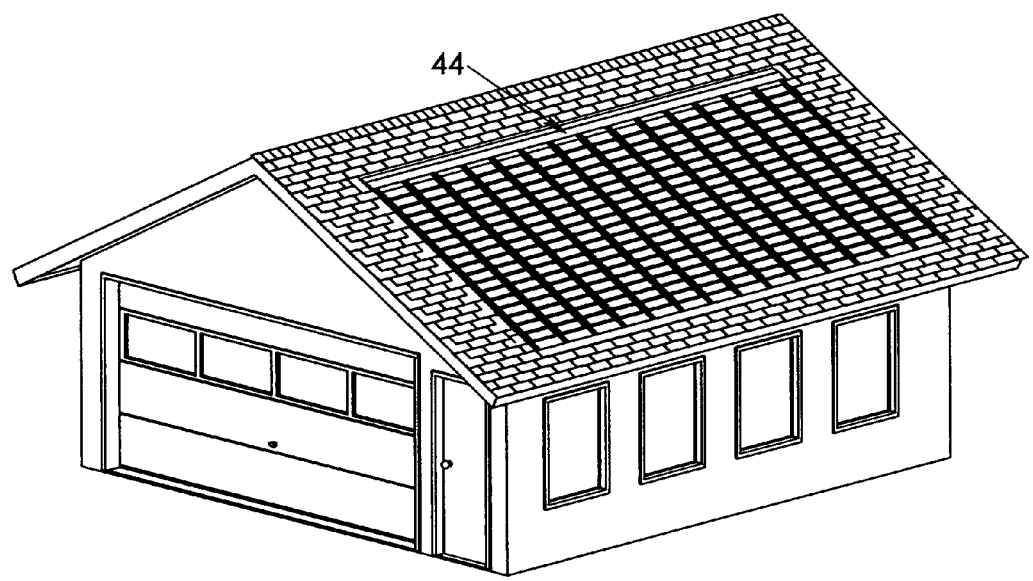
FIG. 1 shows an isometric view of a complete photovoltaic roof panels and flashing assembly integrated into an asphalt roof on a garage.
Figure 2:
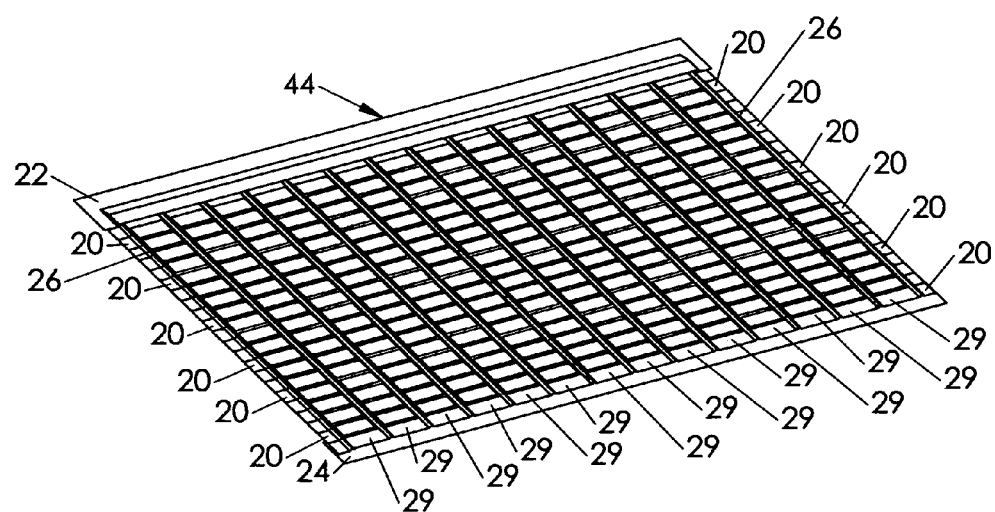
FIG. 2 shows an isometric view of a photovoltaic roof panels and flashing assembly.

FIGS. 1 and 2

Preferred Embodiment

A preferred embodiment of the roof integrated photovoltaic panels and flashing system is illustrated in FIG. 1 (isometric view of photovoltaic system integrated into an asphalt roof) and FIG. 2 (isometric view of a photovoltaic system). The PV system assembly 44 includes starter flashing 24 that sits on top of asphalt roofing, on top of the starter flashing 24 are several PV solar base roof panels 29. Step flashing 20 is formed to cover the structural ribs on the sides of the roof panels 29 and also the other side of step flashing 24 is flat to form fit into each row the asphalt shingles. Counter flashing 26 is formed to match the profile of the structural rib of panel 29 and step flashing 20 this provides extra weather proofing. The edges of counter flashing 26 are hemmed to prevent capillary action of water between the step flashing 20 and counter flashing 26. One of the structural ribs on panel 29 is contoured to break capillary action of water when panels 29 are tied together, providing waterproofing between panels. On top of the panels 29, step flashing 20 and counter flashing 26 is a top flashing 22. Asphalt shingles go over the top flashing 22. The top flashing allows the asphalt roofing above the PV system. Assembly 44 allow water to flow down the asphalt roofing over the top flashing 22 continuing that water flow over panels 29, step flashing 20 and counter flashing 26, continuing on over starter flashing 24 back on top of lower asphalt roofing.

The preferred embodiment of the roof integrated photovoltaic panels and flashing system illustrated in FIG. 1, shows the ideal easement for a firefighter to access the ridge of the roof. Allowing asphalt along that easement allowing optimal footing, (grip to the roof) when climbing to the ridge and axing the holes into the roofs ridge to release the dangerous gases produced in a fire.

FIG. 1 shows the asphalt roofing completely around the PV solar assembly 44. This is a more cost effective installation of a PV system, and a preferred look for certain building owners. When buildings are engineered, they use the weight of the asphalt roofing in the calculations of roof loads for rafter design. Since the weight of the PV solar assembly 44 is less than the weight of the asphalt roofing it replaces, rafters do not need to be re-engineered for the installation of PV assembly 44, another cost saving to the building owner.

Figure 3:
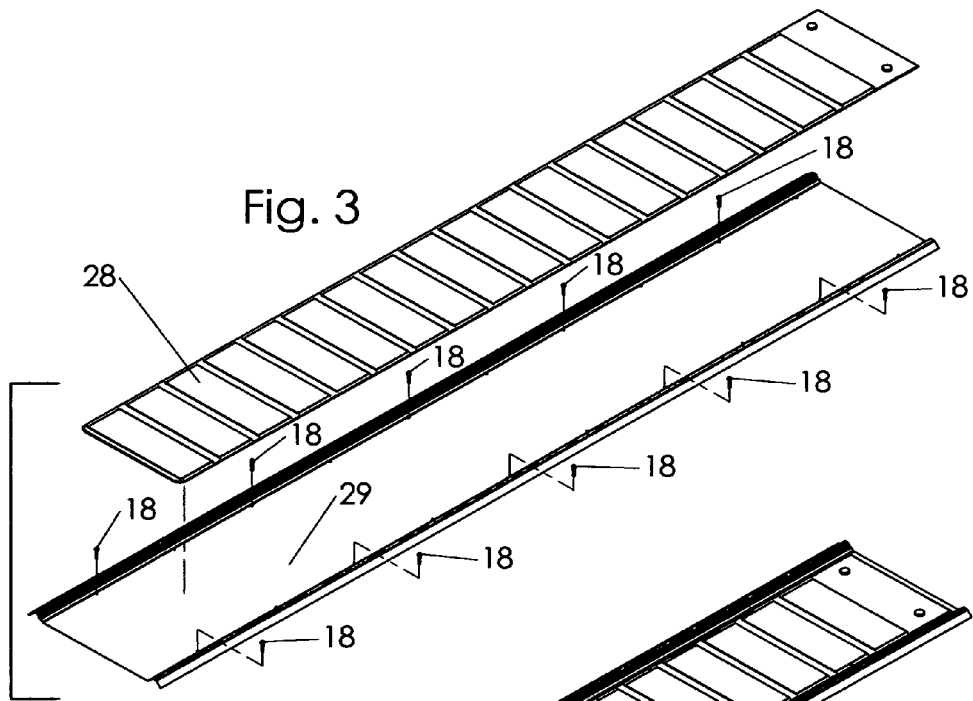
FIG. 3 shows an isometric exploded view of a thin film amorphous photovoltaic cells, a metal roof panel with self sealing exposed fasteners along the structural ribs of the roof panel.

Roof panel 29 in FIG. 3 is made of 26-24 gauge metal. This 26-24 gauge metal is "non-combustible" also provides structural strength and weather proofing to the roof panel 29. The 26-24 gauge metal allows the roof panel 29 to meet building codes for fire prevention, structural strength and weather proofing. The structural ribs on the side of the roof panel 29 shown in FIG. 5 give added structural strength to the roof panel 29. The different contour of one rib and the height of the rib on the panel allows for a break of capillary action in the overlap of roof panels 29 to roof panels 29 place alongside each other in system assembly 44.

Roof panel 29 is secured to the roof deck with self sealing exposed fasteners 18, providing a weather tight seal around the roof panel 29 penetration. This pattern of fastening shown in FIG. 3 allows roof panel 29 to be secured to the deck in a manner that meet wind uplift codes. Adding or removing fasteners 18 along the structural rib of roof panel 29. Allows adjustments for wind uplift requirements of certain locations.

Figure 4:
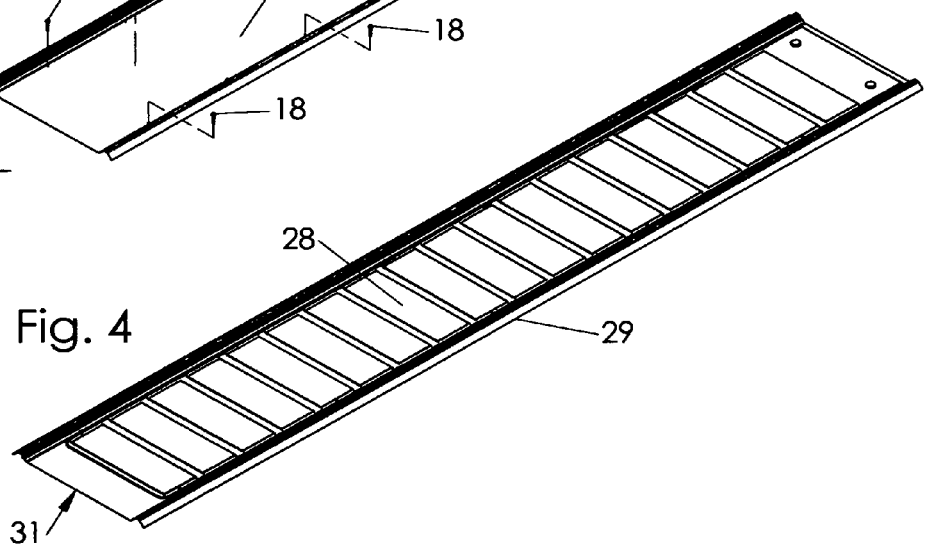
FIG. 4 shows an isometric view of a thin film amorphous photovoltaic cells adhered to a metal roof panel making a PV solar panel.

These fasteners 18 allow the PV roof panel 31 in FIG. 4, FIG. 5 to be individually installed and replacement. Allowing the photovoltaic system wiring too stay in its original state, by replacing the exact damaged PV solar panel 31.

FIG. 8, FIG. 9, FIG. 10 and FIG. 11 show the parts and placement of flashing system. The combination of FIG. 8, 9, 10, 11 shows the flashing system starts with a starter flashing 24 next on top is a short solar base roofing panel 29a, that has short PV photovoltaic cells 28a adhered to it. Followed by, several step flashing 20, interlaced up the structural rib of roof panel 29a. Counter flashing 26 covers the entire length of the structural rib of roof panel 29a, sandwiching the step flashing 20 between the counter flashing 26 and structural rib of roof panel 29a. Top flashing 22a covers the top of the roof panel 29a, covers the wiring of PV photovoltaic cells 28a. Top flashing 22a also covers the counter flashing 26 and the top step flashing 20. The flashing is place in a manner to shed water in a downward motion preventing water penetration. Starter flashing 24, roof panel 29, step flashing 20, counter flashing 26 and top flashing 22a are made of 26-24 gauge metal. 26-24 gauge metal is "non-combustible" allowing the flashings to meet fire prevention codes. 26-24 gauge metal meets structural strength codes, weather proofing codes on roof flashings.

FIG. 6 and FIG. 7 show how the asphalt shingle 52,52a and 52b are interlaced into starter flashing 24 and step flashing 20. FIG. 6 and FIG. 7 show the position and placement of roof panel 29a to roof panel 29a.

Operations
FIGS. 1-11

The manner of installation and functions of parts that make up the roof integrated photovoltaic panels and flashing system into asphalt roofing viewed in FIG. 1 and FIG. 2. Starting installation with FIG. 6 and FIG. 7 asphalt shingles 52 applied to the roof from the eave to the photovoltaic system. The first part of the flashing system to install is the starter flashing 24 with roofing nails 17. Position the start flashing 24 over the row of shingles 52 and in line with shingle 52a. The end of the starter flashing will go under shingle 52a 4 inches or more. So as to catch the water flowing between shingle 52a and roof panel 29a. Starter flashing 24 is the same width as a shingle 52 and functions as a shingle, the top of the starter flashing has a hem on the top that functions as a water return. The metal starter flashing 24 provides a protective layer between the asphalt roofing 52 and PV roof panel 29. When fastening down the PV roof panel 29 the starter flashing prevents the bottom edges of the panel and ribs from cutting into the asphalt roofing.

Roof panel 29a lines up with the next row of asphalt shingle 52b along the bottom and edge like in FIG. 6 and FIG. 7 and step flashing 20 ties the two together. Roofing nail 17 secures the step flashing 20 in place. The next row of shingle 52a is placed into position and the next step flashing 20 is placed in line with it, and forms over the structural rib of roof panel 29a. This step flashing 20 and shingle 52 procedure goes all the way to the top of the roof panel 29. Step flashing 20 is made of 26-24 gauge steel. One side of the step flashing 20 forms to and covers the structural rib of roof panel 29, and the other end of the step flashing 20 runs 4-5 inches out from the rib in between the asphalt shingle layers. This keeps the water flowing down the roof and not getting into the seam between the roof panel 29 and asphalt shingles 52, 52a, 52b. The step flashing 20 is a couple inches longer than the overlap of shingles, to overlap itself as it is flashed up the rib of the roof panel, along with rows of shingles. FIG. 11 Show the overlap of the step flashing 20 from the bottom to the top of the roof panel 29.

Counter flashing 26 runs the length of the roof panel 29 covering the step flashing 20 providing extra weather proofing and hold the step flashing tight to the structural rib of the roof panel. The counter flashing 26 is fastened to the roof panel rib, with self sealing fasteners 18 on the top and bottom as shown in FIGS. 8, 9, 10 and 11. The counter flashing 26 is made of metal and hemmed on the edges for added structural strength. It mates the contour of the rib of the roof panel and step flashing for strength and water tightness.

The purpose of top flashing 22 is to divert the water coming off the shingles 52 above the photovoltaic system to flow over roof panels 29, counter flashing 26, step flashing 20 and the asphalt shingles covering step flashing on each edge of the system. So the top is run under the row of asphalt shingles above the top flashing 22. This top flashing 22 is made of metal and fastened to the top of all the structural ribs of the PV roof panels 29a as shown in FIGS. 8, 9, 10 and 11. The self sealing fasteners 18 are the only fasteners holding it in place. Allowing the fasteners to be removed and pull the top flashing out from under the row of shingles. This provides a means of servicing the wiring and photovoltaic panel removal and replacement.

Roof panel 29 is made of 26-24 gauge metal that is "non-combustible". It has structural ribs on each end that provide structural strength and water proofing. One of the ribs has different profile that creates a pocket between the profiles of one panel seamed to the other, to stop capillary action from drawing water up to the top of the ribs where they overlap.

The roof panel 29 is fastened to the roof deck with self sealing exposed fasteners 18, in a pattern shown in FIG. 3 along the rib of the roof panel 29 but not through the photovoltaic cells 28. This allows for individual installation and removal of roof panel 29 and photovoltaic cells 28. Fasteners are added as need to meet higher wind uplift requirements. The flat section between the two ribs of the panel, allow room for the photovoltaic cells 28 and fasteners 18 on each side.

Advantages

From the description above, a number of advantages of our roof integrated photovoltaic panel and flashing system become evident:

(a) This system allows you to be able to install a PV system in the middle or tie into part of any asphalt roof system.
(b) This system allows you to install on a roof without re-engineering the rafter of the building.
(c) This system allows you to meet any wind uplift codes.
(d) This system allows you to meet any fire prevention codes.
(e) This system allows you to meet any weather proofing codes.
(f) This system allow firefighter easement too and along the ridge to be asphalt roofing.
(g) This system allows you to install a photovoltaic system in a cost effective manner.
(h) This system allow for color matching as desired by consumer.
(i) The PV roof panels in this system can be easily individually removed and replace.
(j) Allowing for PV panel replacement without rewiring the system.
(k) The panel design allow you to have PV panels rows running horizontal and vertically across the roof.
(l) The PV Panel can be used as a free standing PV panel, mounted on an independent framing structure.
(m) The PV Panel can be mounted on purlins over the top of an existing roof.
(n) The PV panel can be used as the roof and PV mounting on a purlin framed structure like a carport.
(o) PV Panel can be used as Structural roof panel.

CONCLUSION, RAMIFICATIONS AND SCOPE

Accordingly, the reader will see that the roof integrated photovoltaic panels and flashing system invention can be used for mounting PV systems easily and conveniently, into any asphalt roofing.

It permits PV panels can be removed and replace without damage to roofing or PV system wiring.

It permits variable colors to meet customer preferences.

It permits the PV Panels to link together horizontally and vertically across roofs.

The PV panels can be use as structural roof panels for free standing structures.

Although the description contains much specificity, these should not be construed as limiting the scope of this invention but merely providing illustrations of some of the presently preferred embodiments of this invention. For example, the material can be Aluminum, Steel, TPO membrane or EPDM membrane. Step Flashing can be modified to fit different roofing materials like Shake, Tile, single ply and double ply roof systems.

Thus the scope of the invention should be determined by the appended claims and their legal equivalents, rather than by the examples given.

What is claimed is:

1. A modular photovoltaic roof panel system for use on an inclined roof having a plurality of substantially horizontal rows of asphalt shingles affixed to a surface of the roof, each said row of shingles being staggered and positioned so as to partially overlap an immediately preceding said row of shingles, the system comprising:
    a length of starter flashing affixed to the roof surface in a position inline with and adjacent to an at least one row of said rows of shingles, substantially parallel with a lower edge of the roof;
    an at least one photovoltaic roof panel affixed to the roof surface in a position inline with and adjacent to an at least one subsequent row of said rows of shingles, substantially perpendicular to the starter flashing, a lower edge of the roof panel partially overlapping the starter flashing;
    each said roof panel having opposing lateral edges, each said opposing lateral edge providing an upwardly protruding longitudinal rib extending a length of the roof panel and configured for selectively interlocking with a longitudinal rib of an adjacently positioned roof panel;
    an at least one length of step flashing positioned and configured for interlacing an outermost one of said roof panels with the shingles of the at least one row of said rows of shingles adjacent to said outermost one of said roof panels, each said length of step flashing providing an upwardly protruding longitudinal rib configured for selectively interlocking overtop of the longitudinal rib of said outermost roof panel; and
    a length of top flashing affixed to the roof surface in a position inline with and adjacent to an at least one subsequent row of said rows of shingles, the top flashing configured for covering an upper edge of the at least one roof panel along with a portion of the step flashing;
    whereby, with the at least one roof panel affixed directly to the roof surface and each of the starter flashing, step flashing and top flashing appropriately engaged with the roof panel and interlaced with the adjacent shingles of the at least one row of said rows of shingles, the system is capable of being integrated into a traditional asphalt shingle roof without affecting load requirements or water impermeability.

2. The modular photovoltaic roof panel system of claim 1 wherein the at least one roof panel is composed of metal having a thickness between 24-gauge and 29-gauge.

3. The modular photovoltaic roof panel system of claim 1, wherein the starter flashing has a height equal to a height of the row of said rows of shingles within which the starter flashing is adjacently positioned.

4. The modular photovoltaic roof panel system of claim 1, wherein the starter flashing provides a hem along a top edge of said starter flashing, said hem configured for functioning as a water return.

5. The modular photovoltaic roof panel system of claim 1, wherein each of the outermost roof panel ribs provides a length of counter flashing positioned and configured for lying over top of the longitudinal rib of said step flashing rib and the longitudinal rib of said roof panel, thereby sandwiching the longitudinal rib of said step flashing between the counter flashing and the longitudinal rib of said roof panel for providing added weatherproofing.

6. The modular photovoltaic roof panel system of claim 5, wherein the counter flashing has a length equal to a length of the corresponding roof panel rib.

7. The modular photovoltaic roof panel system of claim 5, wherein the counter flashing provides a hem along opposing edges of said counter flashing for preventing capillary action of water between said step flashing and said counter flashing.

8. The modular photovoltaic roof panel system of claim 1, wherein at least one said longitudinal rib of each roof panel is longitudinally contoured for breaking capillary action of water when interlocked with the longitudinal rib of an adjacently positioned roof panel.

9. The modular photovoltaic roof panel system of claim 1, wherein each said roof panel provides a plurality of thin film photovoltaic cells affixed to said roof panel in a position between the ribs.

10. The modular photovoltaic roof panel system of claim 9, wherein the top flashing is further positioned and configured for covering each of an at least one electrical connector interconnected with the plurality of said thin film photovoltaic cells.

11. The modular photovoltaic roof panel system of claim 1, wherein each said roof panel is affixed to the roof surface with a plurality of self-sealing exposed fasteners.

12. The modular photovoltaic roof panel system of claim 1, wherein a plurality of lengths of step flashing is positioned overtop of the corresponding outermost roof panel rib in an overlapping fashion from the lower edge to the upper edge of the roof panel.

13. A modular photovoltaic roof panel system for use on an inclined roof, the system comprising:
    a solar assembly affixed to a surface of the roof, the assembly comprising:
        a length of starter flashing positioned substantially parallel with a lower edge of the roof;
        an at least one photovoltaic roof panel positioned substantially perpendicular to the starter flashing, a lower edge of the roof panel partially overlapping the starter flashing;
        each said roof panel having opposing lateral edges, each said opposing lateral edge providing an upwardly protruding longitudinal rib extending a length of the roof panel and configured for selectively interlocking with a longitudinal rib of an adjacently positioned roof panel;
        each of an outermost one of said longitudinal ribs of an outermost one of said roof panels providing an at least one length of step flashing, each said length of step flashing providing an upwardly protruding longitudinal rib configured for selectively interlocking overtop of the longitudinal rib of said outermost roof panel; and a length of top flashing positioned substantially parallel with the starter flashing and configured for covering an upper edge of the at least one roof panel along with a portion of the step flashing; and a plurality of rows of asphalt shingles affixed to the roof surface in a position substantially parallel with the lower edge of the roof, each said row of shingles being staggered and positioned so as to partially overlap an immediately preceding said row of shingles as well as said solar assembly;

whereby, with the at least one roof panel affixed directly to the roof surface and each of the starter flashing, step flashing and top flashing appropriately engaged with the roof panel and interlaced with the adjacent shingles of the at least one row of said rows of shingles, the system is capable of being integrated into a traditional asphalt shingle roof without affecting load requirements or water impermeability.

14. The modular photovoltaic roof panel system of claim 13, wherein said solar assembly is positioned on the roof surface such that an easement is maintained for accessing an upper edge of the roof.

15. A modular photovoltaic roof panel system for use on an inclined roof having a plurality of substantially horizontal rows of asphalt shingles affixed to a surface of the roof, each said row of shingles being staggered and positioned so as to partially overlap an immediately preceding said row of shingles, the system comprising:

a length of starter flashing affixed to the roof surface in a position inline with and adjacent to an at least one row of said rows of shingles, substantially parallel with a lower edge of the roof, the starter flashing having a height equal to a height of the at least one row of said rows of shingles within which the starter flashing is adjacently positioned;

an at least one photovoltaic roof panel affixed to the roof surface in a position inline with and adjacent to an at least one subsequent row of said rows of shingles, substantially perpendicular to the starter flashing, a lower edge of the roof panel partially overlapping the starter flashing and aligned with a lower edge of the at least one subsequent row of said rows of shingles;

each said roof panel having opposing lateral edges, each said opposing lateral edge providing an upwardly protruding longitudinal rib extending a length of the roof panel and configured for selectively interlocking with a longitudinal rib of an adjacently positioned roof panel;

an at least one length of step flashing positioned and configured for interlacing an outermost one of said roof panels with the shingles of the at least one row of said rows of shingles adjacent to said outermost one of said roof panels, each said length of step flashing providing an upwardly protruding longitudinal rib configured for selectively interlocking overtop of the longitudinal rib of said outermost roof panel;

each of the outermost roof panel ribs providing a length of counter flashing positioned and configured for lying over top of the longitudinal rib of said step flashing rib and the longitudinal rib of said roof panel rib, thereby sandwiching the longitudinal rib of said step flashing rib between the counter flashing and the longitudinal rib of said roof panel for providing added weatherproofing; and a length of top flashing affixed to the roof surface in a position inline with and adjacent to an at least one subsequent row of said rows of shingles, the top flashing configured for covering an upper edge of the at least one roof panel along with a portion of the step flashing and counter flashing;

whereby, with the at least one roof panel affixed directly to the roof surface and each of the starter flashing, step flashing, counter flashing and top flashing appropriately engaged with the roof panel and interlaced with the adjacent shingles of the at least one row of said rows of shingles, the system is capable of being integrated into a traditional asphalt shingle roof without affecting load requirements or water impermeability.

\* \* \* \* \*